United States Patent [19]
Gibson

[11] Patent Number: 6,052,716
[45] Date of Patent: Apr. 18, 2000

[54] APPARATUS AND METHOD IN HIERARCHY OF INTERNET WEB PAGES FOR FAST RETURN TO A NETWORK PAGE

[75] Inventor: Kevin Patrick Gibson, Rochester, Minn.

[73] Assignee: International Business Machines Corporation, Armonk, N.Y.

[21] Appl. No.: 08/861,879

[22] Filed: May 22, 1997

[51] Int. Cl.$^7$ ...................................................... G06F 17/30
[52] U.S. Cl. ........................... 709/217; 709/218; 709/219; 709/245
[58] Field of Search .................................... 709/217, 218, 709/219, 245, 200

[56] References Cited

U.S. PATENT DOCUMENTS

| | | | |
|---|---|---|---|
| 5,712,979 | 1/1998 | Graber et al. | 395/200.11 |
| 5,717,860 | 2/1998 | Graber et al. | 395/200.12 |
| 5,902,353 | 5/1999 | Reber et al. | 709/219 |

OTHER PUBLICATIONS using netscape 2, by mark r. brown, isbn :0-7897-0612-1, 1995.

Primary Examiner—Dung C. Dinh
Assistant Examiner—Abdullahi E. Salad
Attorney, Agent, or Firm—Michael R. Barré ; Andrew J. Dillon

[57] ABSTRACT

An apparatus and method are disclosed in a network navigator for rapidly returning to a search engine network page while searching through a hierarchy of networked pages displayed within a computer system interface. Initially, a list of commonly utilized search engine network addresses is compiled. Next, a hierarchy of network addresses accessed by the network navigator during a network navigating session is compiled. Thereafter, the hierarchy of network addresses is scanned until a network address among the hierarchy of network addresses is identified that corresponds to a search engine network address listed in the list of commonly utilized search engine network addresses. Finally, the network navigator jumps to the network address corresponding to the search engine network address. In addition, the hierarchy of network addresses can be scanned until a network address among the hierarchy of network addresses is identified that correspond to a network address associated with a server other than a server associated with a network page currently displayed within the computer interface, and thereafter, the network navigator jumps to the network address associated with the server other than the server associated with the network page currently displayed within the computer interface.

21 Claims, 13 Drawing Sheets

COMPILING MECHANISM

APPARATUS AND METHOD IN HIERARCHY OF INTERNET WEB PAGES FOR FAST RETURN TO A NETWORK PAGE

FIELD OF THE INVENTION

The present invention relates in general to data processing systems. In particular, the present invention relates to an improved browser method, system, and program product.

BACKGROUND

The development of computerized information resources, such as the "Internet," allows users to link with servers and networks, and thus retrieve vast amounts of electronic information heretofore unavailable in an electronic medium. Such electronic information increasingly is displacing more conventional means of information transmission, such as newspapers, magazines, and even television. The term "Internet" is an abbreviation for "Internetwork," and refers commonly to a collection of computer networks that utilize the TCP/IP suite of protocols, well-known in the art of computer networking. TCP/IP is an acronym for "Transport Control Protocol/Interface Program," a software protocol developed by the Department of Defense for communication between computers.

Electronic information transferred between computer networks (e.g., the Internet) can be presented to a user in hypertext, a metaphor for presenting information in a manner in which text, images, sounds, and actions become linked together in a complex non-sequential Web of association that permit the user to "browse" through related topics, regardless of the presented order of the topics. These links are often established by both the author of a hypertext document and by the user, depending on the intent of the hypertext document. For example, traveling among links to the word "iron" in an article displayed within a graphical user interface in a computer system might lead the user to the periodic table of the chemical elements (i.e., linked by the word "iron"), or to a reference to the use of iron in weapons in Europe in the Dark Ages. The term "hypertext" is utilized to describe documents, as presented by a computer, that express the nonlinear structure of ideas, as opposed to the linear format of books, film, and speech.

Hypertext, especially in an interactive format where choices are controlled by the user, is structured around the idea of offering a working and learning environment that parallels human thinking—that is, an environment that allows the user to make associations between topics rather than moving sequentially from one topic to the next, as in an alphabetic list. Hypertext topics are linked in a manner that allows users to jump from one subject to other related subjects during a search for information.

Networked systems utilized hypertext conventions typically follow a client/server architecture. A "client" is a member of a class or group that utilizes the services of another class or group to which it is not related. In the context of a computer network such as the Internet, a client is a process (i.e., roughly a program or task) that requests a service provided by another program. The client process utilizes the requested service without having to "know" any working details about the other program or the service itself. In networked systems, a client is usually a computer that accesses shared network resources provided by another computer (i.e., a server).

A "server" is typically a remote computer system accessible over a communications medium such as the Internet. The server scans and searches for raw (e.g., unprocessed) information sources (e.g., newswire feeds or newsgroups). Based upon such requests by the user, the server presents filtered electronic information to the user as server responses to the client process. The client process may be active in a first computer system, and the server process may be active in a second computer system, and the client and server processes may communicate with one another over a communications medium that allows multiple clients to take advantage of the information-gathering capabilities of the server.

Client and server can communicate with one another utilizing the functionality provided by a hypertext transfer protocol (HTTP). The World Wide Web (WWW) or, simply, the "Web," includes all servers adhering to this protocol, which are accessible to clients via a Universal Resource Locator (URL). Internet services can be accessed by specifying Universal Resource Locators that have two basic components: a protocol to be used and an object pathname. For example, the Universal Resource Locator address, "http://www.uspto.gov" (i.e., home page for the U.S. Patent and Trademark Office), specifies a hypertext transfer protocol ("http") and a pathname of the server ("www.uspto.gov"). The server name is associated with a unique numeric value (TCP/IP address). Active within the client is a first process, known as a "browser," that established the connection with the server and presents information to the user. The server itself executes corresponding server software that presents information to the client in the form of HTTP responses. The HTTP responses correspond to "Web pages" constructed from a Hypertext Markup Language (HTML), or other server-generated data.

A "Web page" (also referred to by some designers simply as a "page") is a data file written in a hyper-text language that may have text, graphic images, and even multimedia objects such as sound recordings or moving video clips associated with that data file. The Web page can be displayed as a viewable object within a computer system. A viewable object can contain one or more components such as spreadsheets, text, hotlinks, pictures, sound, and video objects. A Web page can be constucted by loading one or more separate files into an active directory or file structure that is then displayed as a viewable object within a graphical user interface.

When a client workstation sends a request to a server for a Web page, the server first transmits (at least partially) the main hypertext file associated with the page, and then loads, either sequentially or simultaneously, the other files associated with the page. A given file may be transmitted as several separate pieces via TCP/IP protocol. The constructed page is then displayed as a viewable object on the workstation monitor. A page may be "larger" than the physical size of the monitor screen, and devices such as graphical user interface scroll bars can be utilized by the viewing software (i.e., the browser) to view different portions of the page.

Browsers typically incorporate or rely upon some form of an Internet search engine that allows users to perform an Internet search. Such a search engine can return an index page of hypertext links (also referred to simply as "links") to other Web pages in response to user-provided search criteria. The search criteria is typically provided to the search engine by the user in the form of keywords. For example, a user who desires to search the Internet on the topic of "kidney transplants" might input to the search engine keywords (i.e., search criteria) such as "medical," "surgery," "transplant," "kidneys," and "organs." The search engine would then return an index page containing numerous hypertext links related, at least in general, to the topic of "kidney transplants."

A problem associated with this type of Internet search is that, when a user explores a link from the index page, the user can potentially end up several pages deep in a hierarchy of Web pages. In order to return to the index page, the user must manually back up through all the intermediate pages or search through a history list provided by the browser. Manually backing up through intermediate pages in this manner or searching through such a history list is a time-consuming process that can potentially lead to errors. For example, the user might accidentally access an unwanted link while searching through a history list.

From the foregoing, it can be seen that a need exists for a method and system that allow a user to obtain index page information without having to manually back up through each Web page included in the hierarchy of Web pages. A mechanism that solves this problem would allow a user to save time and energy in retrieving a Web site accessed earlier during an Internet search session.

SUMMARY

It is therefore one object of the present invention to provide for an improved browser apparatus and method.

It is therefore another object of the present invention to provide an improved browser that allows users to return rapidly from a currently displayed network page to an earlier encountered network page.

The above and other objects are achieved as is now described. An apparatus and method are presented in a network navigator for returning to a search engine network page after searching through a hierarchy of networked pages displayed within a computer system interface. Initially, a list of commonly utilized search engine network addresses is compiled. Next, a hierarchy of network addresses accessed by the network navigator during a network navigating session is compiled. Thereafter, the hierarchy of network addresses is scanned until a network address among the hierarchy of network addresses is identified which corresponds to a search engine network address listed in the list of commonly utilized search engine network addresses. Finally, the network navigator jumps to the network address corresponding to the search engine network address. In addition, the hierarchy of network addresses can be scanned until a network address among the hierarchy of network addresses is identified which corresponds to a network address associated with a server other than a server associated with a network page currently displayed within the computer interface, and thereafter, the network navigator jumps to the network address associated with the server other than the server associated with the network page currently displayed within the computer interface.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of a preferred embodiment when read in conjunction with the accompanying drawings, wherein:

DETAILED DESCRIPTION

Figure 1:
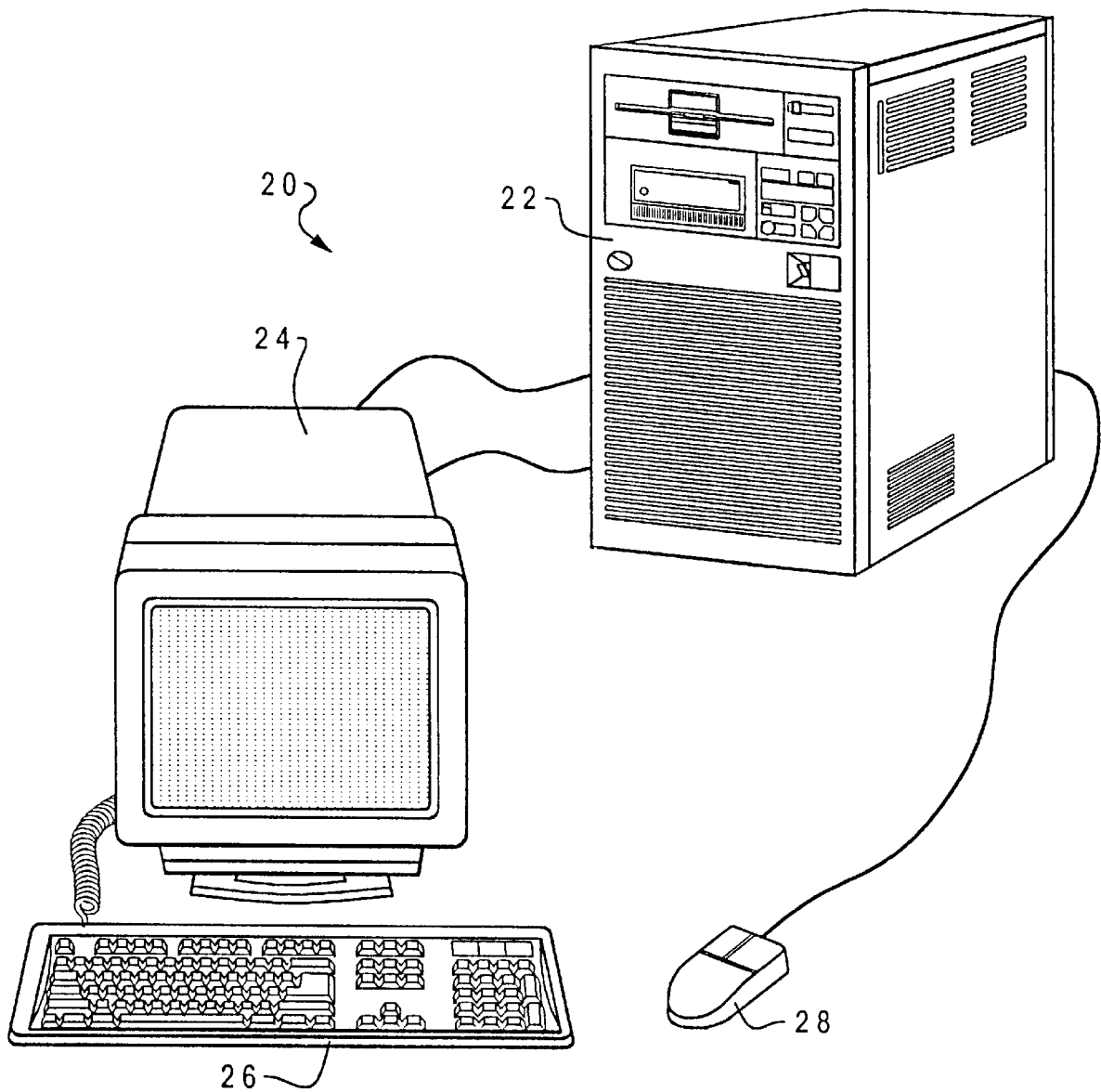
FIG. 1 illustrates a pictorial representation of a computer system which may be utilized to implement a preferred embodiment of the present invention.
Figure 2:
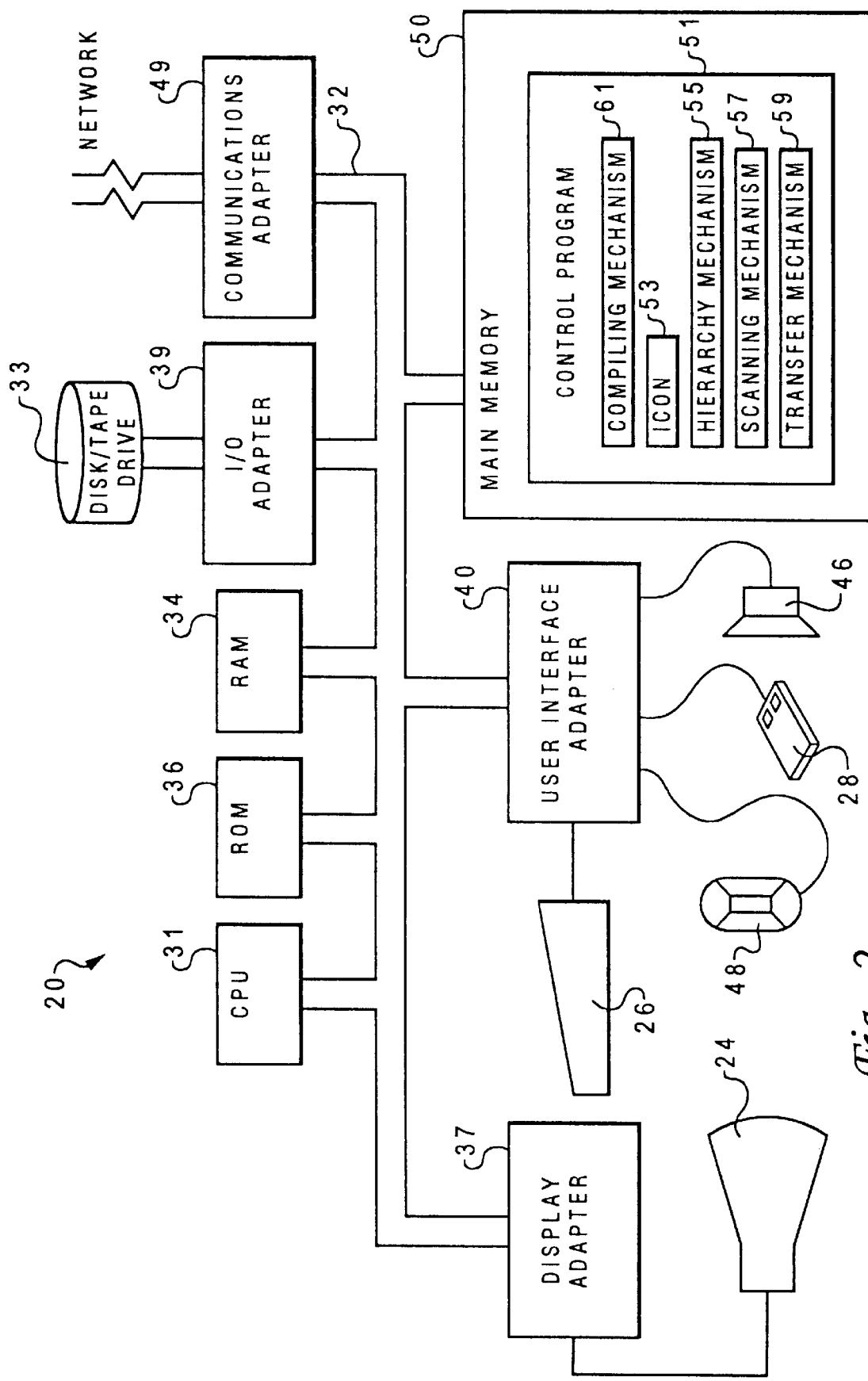
FIG. 2 depicts a representative hardware environment of the computer system of a preferred embodiment of the present invention.

With reference now to the figures and in particular with reference to FIG. 1, there is depicted a pictorial representation of a computer system in accordance with a preferred embodiment of the present invention. A computer system 20 is depicted that includes a system unit 22, a video display terminal 24, a keyboard 26, and a mouse 28. Computer system 20 can be implemented utilizing any suitable computer such as the AS/400 computer system or IBM "Aptiva" computer, both products of International Business Machines Corporation, located in Armonk, N.Y. However, those skilled in the art will appreciate that the mechanisms and apparatus of the present invention apply equally to any computer system, regardless of whether the computer system is a complicated multi-user computing apparatus or a single-user workstation. In FIG. 1 and FIG. 2, like parts are identified by like numbers.

FIG. 2 depicts a representative hardware environment of the computer system of a preferred embodiment of the present invention. Computer system 20 includes a Central Processing Unit ("CPU") 31, such as a conventional microprocessor, and a number of other units interconnected via system bus 32. Such components and units of computer system 20 can be implemented in a system unit such as system unit 22 of FIG. 1. Computer system 20 further includes random-access memory ("RAM") 34, read-only memory ("ROM") 36, display adapter 37 for connecting system bus 32 to video display terminal 24, and I/O adapter 39 for connecting peripheral devices (e.g., disk and tape drives 33) to system bus 32.

Video display terminal 24 displays the visual output of computer system 20. Video display terminal 24 can be a CRT-based video display well-known in the art of computer hardware. However, with a portable or notebook-based computer, video display terminal 24 can be replaced with an LCD-based or a gas plasma-based flat-panel display. Computer system 20 further includes user interface adapter 40 for connecting keyboard 26, mouse 28, speaker 46, microphone 48, and/or other user interface devices, such as touch-screen device (not shown), to system bus 32. Communications adapter 49 connects computer system 20 to a computer network. Although computer system 20 is shown to contain only a single CPU and a single system bus, it should be understood that the present invention applies equally to computer systems that have multiple CPUs and to computer systems that have multiple buses that each perform different functions in different ways.

Computer system 20 also includes an interface that resides within a machine-readable media to direct the operation of computer system 20. Any suitable machine-readable media may retain the interface, such as RAM 34, ROM 36, a magnetic diskette, magnetic tape, or optical disk (the last three being located in disk and tape drives 33). Any suitable operating system and associated interface (e.g., Microsoft Windows) may direct CPU 31. For example, the AIX operating system and AIXwindows windowing system can direct CPU 31. The AIX operating system is IBM's implementation of the UNIX operating system. UNIX is a trademark of UNIX Systems Laboratories, Inc. Other technologies also can be utilized in conjunction with CPU 31, such as touch-screen technology or human voice control. Those skilled in the art will appreciate that the hardware depicted in FIG. 2 may vary for specific applications. For example, other peripheral devices such as optical disk media, audio adapters, or chip programming devices, such as PAL or EPROM programming devices well-known in the art of computer hardware and the like, may be utilized in addition to or in place of the hardware already depicted.

Main memory 50 is connected to system bus 32, and includes a control program 51. Control program 51 resides within main memory 50, and contains instructions that, when executed on CPU 31, carries out the operations depicted in the logic flowchart of FIG. 7 and FIG. 8 described herein. The computer program product also can be referred to as a program product. Control program 51 is further shown to contain icon mechanism 53, hierarchy mechanism 55, scanning mechanism 57, transfer mechanism 59, and compiling mechanism 61, each of which are described in greater detail in the text associated with FIG. 9.

It is important to note that, while the present invention has been (and will continue to be) described in the context of a fully functional computer system, those skilled in the art will appreciated that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links.

Figure 3:
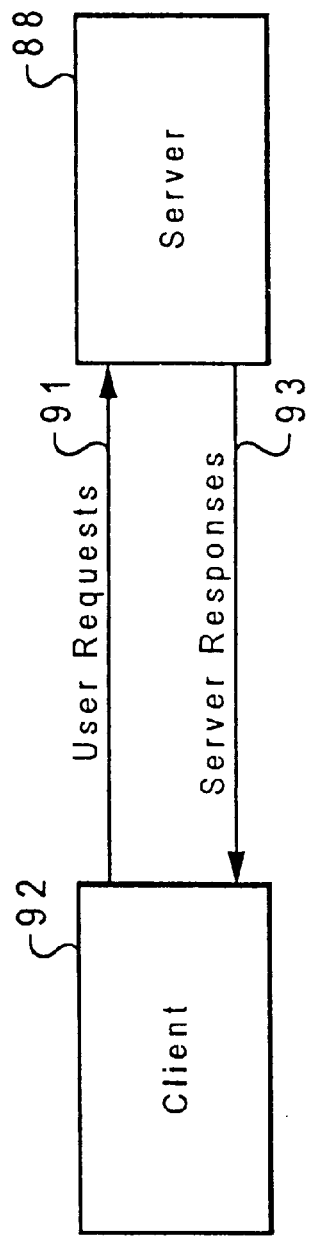
FIG. 3 illustrates a block diagram illustrative of a client/server architecture in accordance with a preferred embodiment of the present invention.
Figure 4:
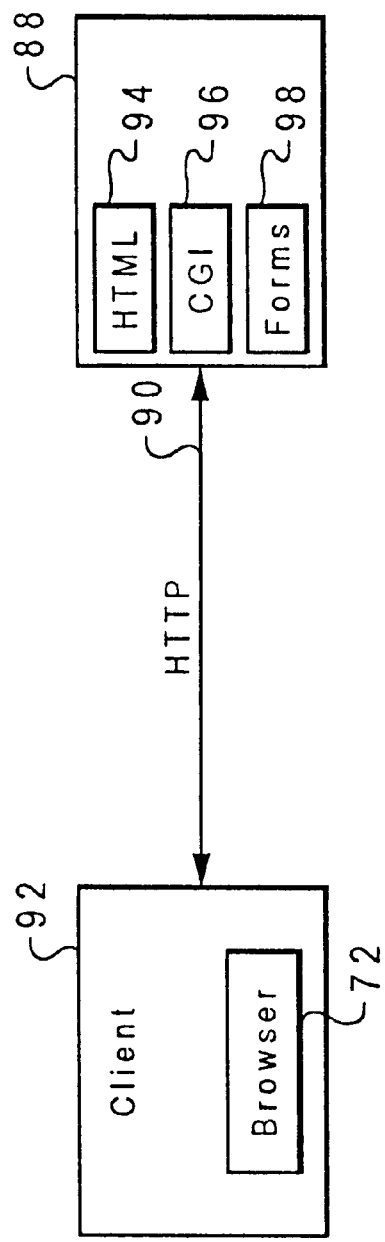
FIG. 4 depicts a detailed block diagram of a client/server architecture in accordance with a preferred embodiment of the present invention.
Figure 5:
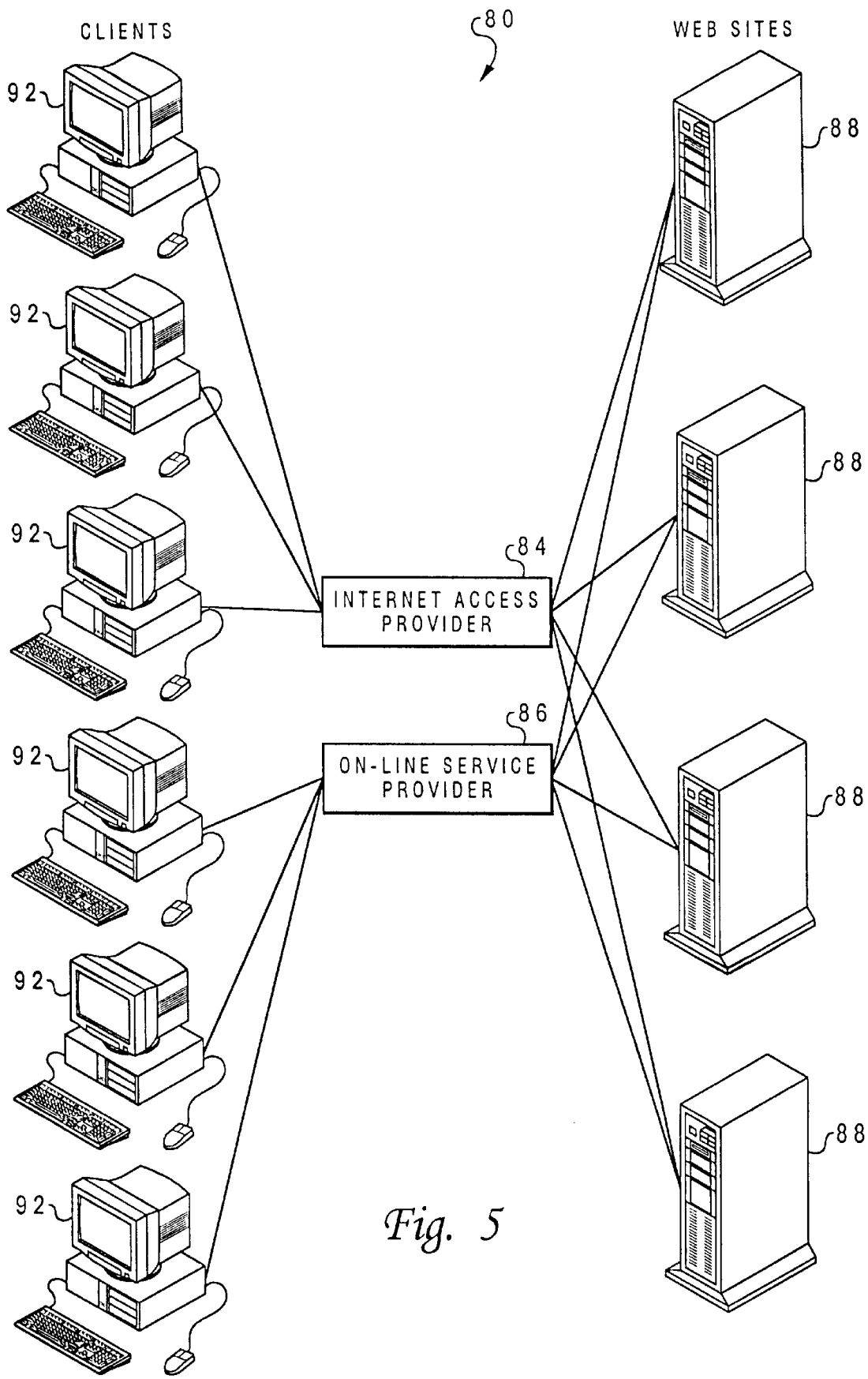
FIG. 5 is a diagram illustrative of a computer network which can be implemented in accordance with a preferred embodiment of the present invention.

In FIG. 3, FIG. 4, and FIG. 5, like parts are indicated by like numbers. FIG. 3 illustrates a block diagram illustrative of a client/server architecture in accordance with a preferred embodiment of the present invention. In FIG. 3, user requests 91 for news are sent by a client application program 92 to a server 88. Server 88 can be a remote computer system accessible over the Internet or other communication networks Client application program 92 may be utilized with computer 10 of FIG. 1 and the implementation of computer 10 illustrated in FIG. 2. Server 88 performs scanning and searching of raw (e.g., unprocessed) information sources (e.g., newswire feeds or newsgroups) and, based upon these user requests, presents the filtered electronic information as server responses 93 to the client process. The client process may be active in a first computer system, and the server process may be active in a second computer system, communicating with one another over a communication medium, thus providing distributed functionality and allowing multiple clients to take advantage of the information-gathering capabilities of the server.

FIG. 4 illustrates a detailed block diagram of a client/server architecture in accordance with a preferred embodiment of the present invention. Although the client and server are processes that are operative within two computer systems, these processes being generated from a high-level programming language (e.g., PERL), which is interpreted and executed in a computer system at runtime (e.g., a workstation), it can be appreciated by one skilled in the art that they may be implemented in a variety of hardware devices, either programmed or dedicated.

Client 92 and server 88 communicate by utilizing the functionality provided by HTTP. Active within client 92 is a first process, browser 72, which established connections with server 88, and presents information to the user. Any number of commercially or publicly available browsers can be utilized in various implementations in accordance with the preferred embodiment of the present invention. For example, the Mosaic-brand browser available from the National Center for Supercomputing Applications (NCSA) in Urbana-Champaign, Ill., can be utilized in accordance with a preferred embodiment of the present invention. Other browsers, such as Netscape™, also provide the functionality specified under HTTP. "Netscape" is a trademark of Netscape, Inc.

Server 88 executes the corresponding server software, which presents information to the client in the form of HTTP responses 90. The HTTP responses 90 correspond with the Web pages represented using HTML, or other data generated by server 88. Server 88 provides HTML 94. Under certain browsers, such as the Mosaic-brand browser described herein, a Common Gateway Interface (CGI) 96 is also provided, which allows the client program to direct server 88 to commence execution of a specified program contained within server 88. This may include a search engine that scans received information in the server for presentation to the user controlling the client. Using this interface, and HTTP responses 90, the server may notify the client of the results of that execution upon completion. Common Gateway Interface (CGI) 96 is one form of a gateway, a device utilized to connect dissimilar networks (i.e., networks utilizing different communications protocols) so that electronic information can be passed from one network to the other. Gateways transfer electronic information, converting such information to a form compatible with the protocols used by the second network for transport and delivery.

In order to control the parameters of the execution of this server-resident process, the client may direct the filling out of certain "forms" from the browser. This is provided by the "fill-in-forms" functionality (i.e., forms 98), which is provided by some browsers, such as the Mosaic-brand browser described herein. This functionality allows the user via a client application program to specify terms in which the server causes an application program to function (e.g., terms or keywords contained in the types of stories/articles which are of interest to the user). This functionality is an integral part of the search engine.

FIG. 5 is a diagram illustrative of a computer network 80, which can be implemented in accordance with a preferred embodiment of the present invention. Computer network 80 is representative of the Internet, which can be described as a known computer network based on the client-server model discussed herein. Conceptually, the Internet includes a large network of servers 88 that are accessible by clients 92, typically users of personal computers, through some private Internet access provider 84 (e.g., such as Internet America) or an on-line service provider 86 (e.g., such as America On-Line, Prodigy, Compuserve, and the like). Each of the clients 92 may run a browser to access servers 88 via the access providers. Each server 88 operates a so-called "Web site" that supports files in the form of documents and pages. A network path to servers 88 is identified by a Universal Resource Locator having a known syntax for defining a network collection.

Figure 6:
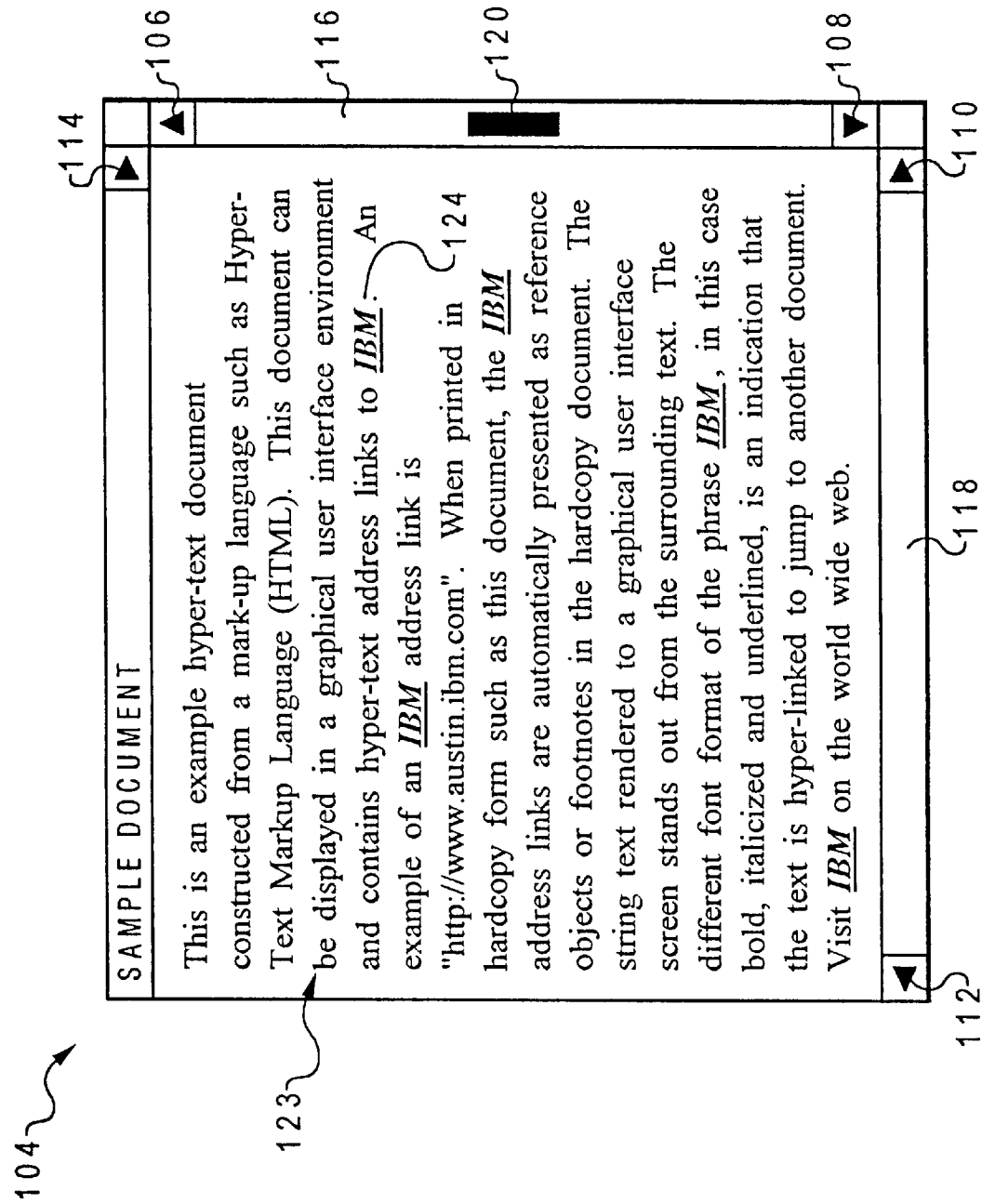
FIG. 6 illustrates an example hypertext document contained within a graphical user interface window and which can be utilized in accordance with the method and system of the present invention.

FIG. 6 illustrates an example hypertext document 123 contained within a graphical user interface window 104, which can be utilized in accordance with a preferred embodiment of the present invention. Window 104 displays a portion of a viewable object (i.e., hypertext document 123) constructed from a mark-up language. One such mark-up language that can be utilized in accordance with the example presented in FIG. 6, is the Hypertext Mark-up Language (HTML). The size and position of elevator 120 within scroll bar 116 corresponds to the size and position of the current viewable page in relation to hypertext document 123. Hypertext document 123 can be accessed from a computer system contained within a computer network such as the Internet.

In the example of FIG. 6, because hypertext document 123 includes too many pages to view simultaneously, the user can position a mouse cursor over up-arrow section 106 or arrow section 108 or scroll bar 116 and click a pointing device (e.g., a mouse) to scroll the hypertext document 123 upward or downward, as appropriate. A vertical scroll bar 118 includes arrow section 112 and arrow section 110 for scrolling hypertext document 123 respectively left or right. Also, an optional arrow section 114 allows a user to scroll the document right. Thus, the graphical user interface that contains window 104 and hypertext document 123 is a type of computer display format that enables a user to choose commands, start programs, and see lists of files and other options by pointing to pictorial representations (i.e., icons) and lists of menu items on the screen. Choices can generally be achieved either with a keyboard or a mouse.

Hypertext document 123 contains specific string text 124 rendered on the screen by the graphical user interface to stand out from the surrounding text. String text 124 is rendered in a different format. In the example of FIG. 6, string text 124 is rendered as IBM. The different font format of string text 124 is an indication that the text is hyper-linked to "jump" to another document. When a user clicks on string text 124 with a mouse or other pointing device, the graphical user interface shifts the presently viewed hypertext document 123 to another hyper-linked document.

Figure 7:
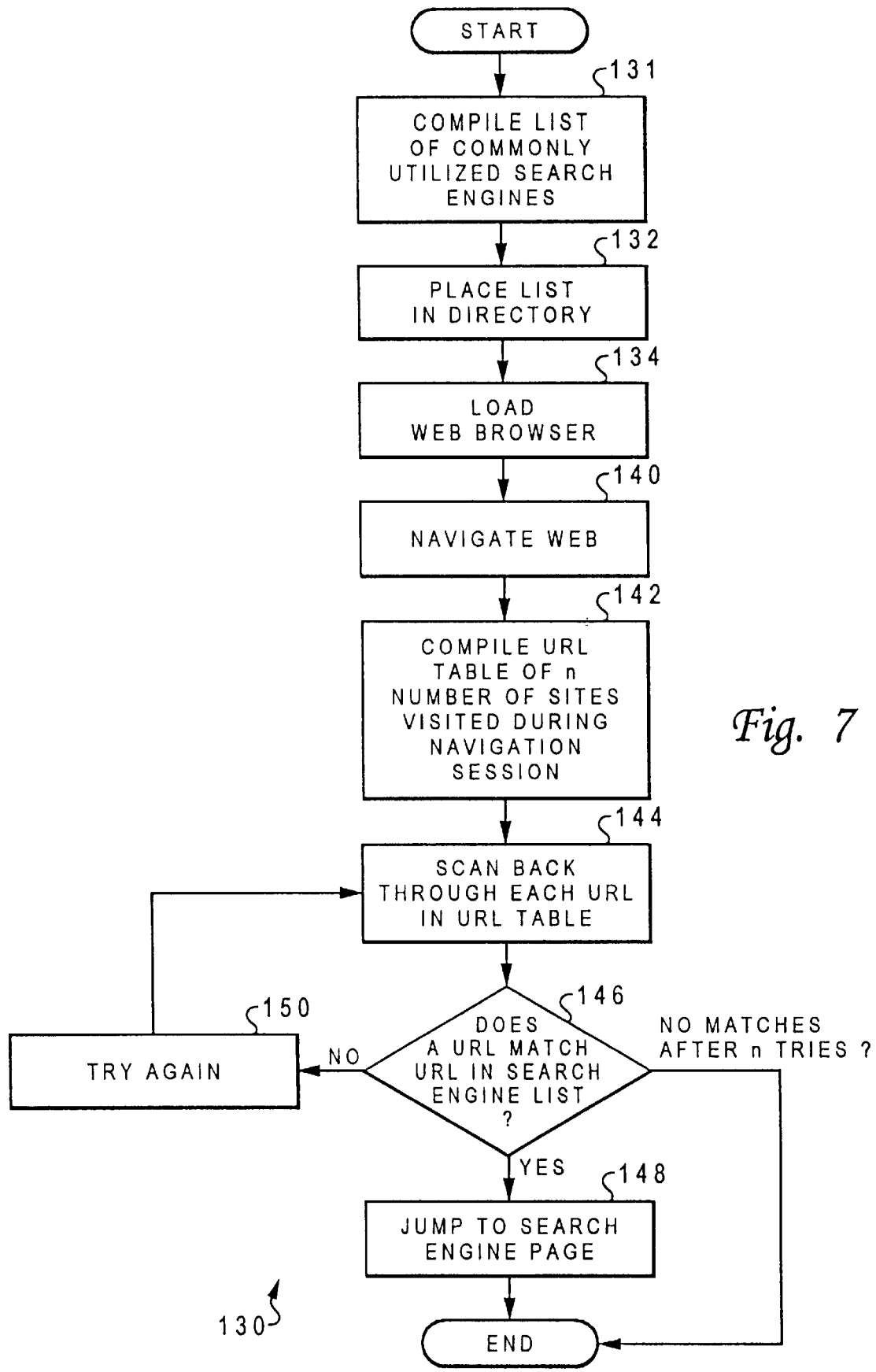
FIG. 7 illustrates a flow diagram that shows specific steps used to carry out the apparatus and method, according to a preferred embodiment of the present invention.

FIG. 7 is a flow diagram 130 that shows specific steps that can be utilized to carry out the apparatus and method, according to a preferred embodiment of the present invention. Initially, as depicted at block 131, a list of commonly utilized search engines, such as Yahoo or Alta Vista and so forth, is compiled. As described at block 132, the compiled list of commonly utilized search engines is placed and maintained within a directory that can be accessed by a given browser. Such a list of commonly utilized search engines includes Universal Resource Locators (i.e., network addresses) that correspond respectively to the location of each search engine within the given network. As depicted at block 134, a browser is initially loaded into a working directory of a graphical user interface. As depicted at block 140, an internet Web navigation session is performed. Such a navigation session may take the form of a search performed on a search engine. For example, when a user performs a search utilizing a search engine, a search engine facility returns an index page of links that match the user's search criteria. When a user explores a link from this page and begins "navigating" the Web, the user may find himself several pages deep in a hierarchy of pages. Such a navigation session begins when the user initially accesses a browser and ends when the user exits the browser.

As illustrated in block 142, a table of Universal Resource Locators of the N number of sites visited during the navigation session is compiled from data contained within the browser. For example, a feature of browser can include an internal list of sites previously visited during a typical browser navigation session. Such a table can include a one- or two-word brief description of a particular site. When a user places a cursor arrow over each one- or two-word description, the Universal Resource Locator corresponding to that particular one- or two-word description is typically displayed somewhere within the browser interface for the user. The table of Universal Resource Locators can be compiled from this list.

As depicted at block 144, the compiled table of Universal Resource Locators is scanned sequentially backwards. Each Universal Resource Locator is scanned individually and compared to the compiled list of commonly utilized search engines, as illustrated at block 146. As described at block 146, a question is asked whether or not a Universal Resource Locator in the compiled table of Universal Resource Locators matches a Universal Resource Locator of a search engine listed in the compiled list of commonly utilized search engines. If the answer to the question posed at block 146 is "no," then, as depicted at block 150, the process makes another attempt to scan for the desired server in the next Universal Resource Locator of the compiled list. If, after N number of attempts, such a server is not identified, the process terminates. However, if the answer to the question posed at block 146 is "yes," then, as depicted at block 148, the browser "jumps" to the site at which the desired server is located (i.e., the search engine site). The aforementioned process steps can be activated via a browser tool bar or menu.

Figure 8:
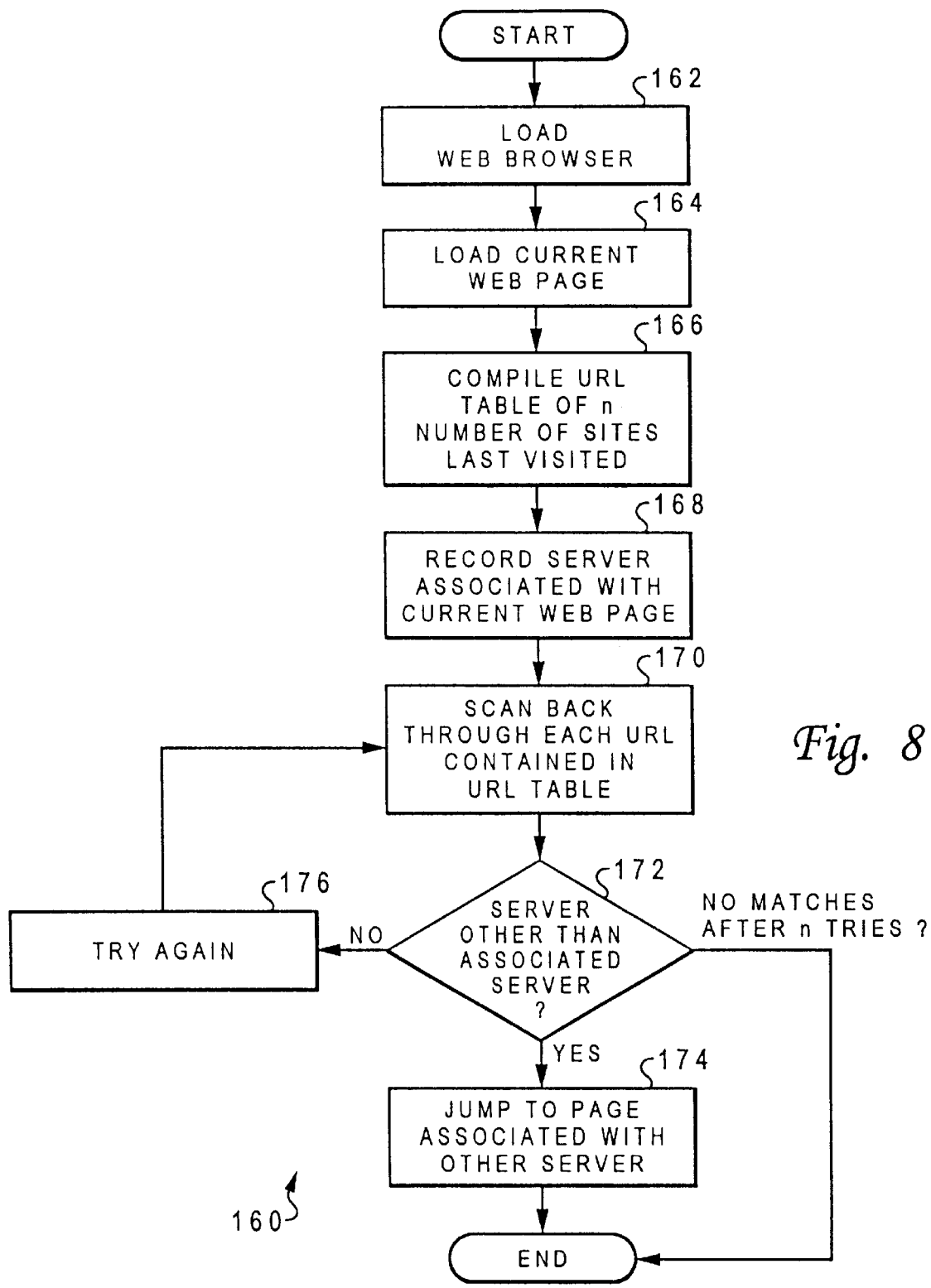
FIG. 8 is a flow diagram that generally shows steps used to carry out the apparatus and method of the present invention, according to a preferred embodiment of the present invention.

FIG. 8 is a flow diagram 160 that shows general steps used to carry out the apparatus and method of the present invention, according to a preferred embodiment of the present invention. As depicted at block 162, a browser is initially loaded into a working directory of a graphical user interface. As illustrated at block 164, a Web page is loaded into the browser after activation of a hypertext link. As described at block 166, a table of Universal Resource Locators (i.e., network addresses) of the N number of sites last visited is compiled from data contained within a network navigator or browser. For example, a feature of a browser can include an internal list of sites previously visited. The table of Universal Resource Locators can be compiled from this list. As depicted at block 168, a server associated with the current Web page is recorded for a comparison operation to be performed later.

As depicted at block 170, the compiled table of Universal Resource Locators is scanned sequentially backwards. As illustrated at block 172, a question is asked whether or not a server other than the one associated with the current Web page exists within the compiled table of Universal Resource Locators. If the answer to the question posed at block 172 is "no," then, as depicted at block 176, the process makes another attempt to scan for the desired server in the next Universal Resource Locator of the compiled list. If, after N number of attempts, such a server is not identified, the process terminates. However, if the answer to the question posed at block 172 is "yes," then, as depicted at block 174, the browser "jumps" to the site at which the desired server is located. The aforementioned process steps can be activated via a browser tool bar or menu.

Figure 9:
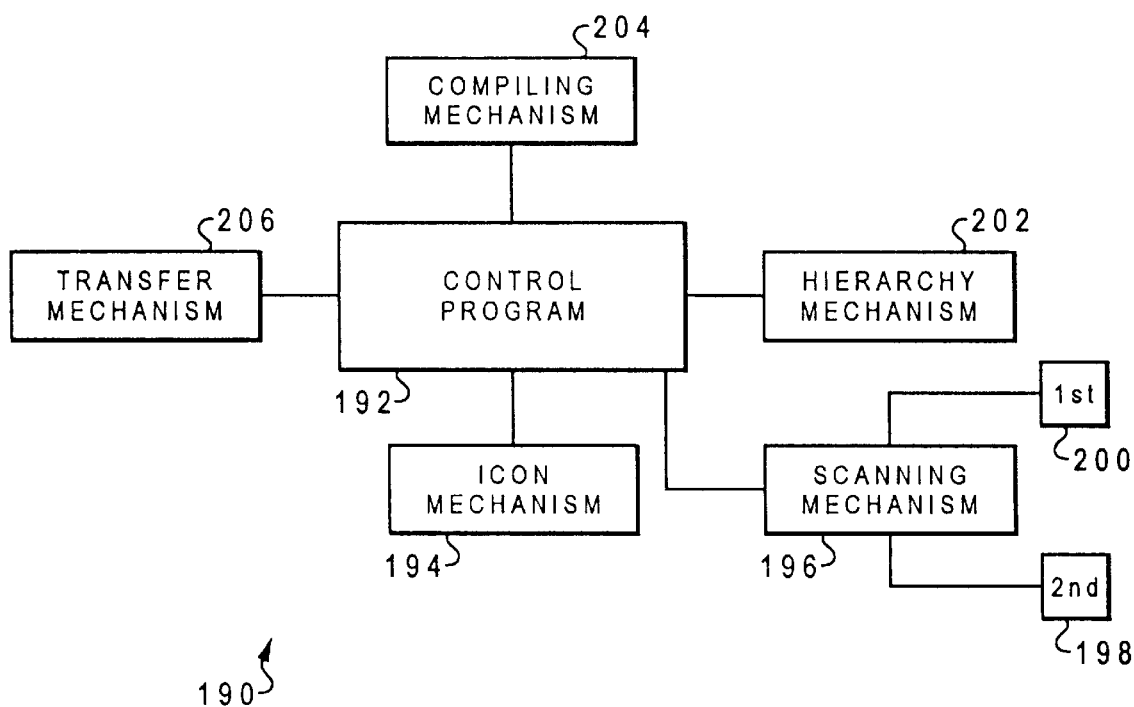
FIG. 9 illustrates a block diagram of a network navigator apparatus that may be utilized in a preferred embodiment of the present invention.

FIG. 9 illustrates a block diagram of a network navigator apparatus 190 that may be utilized in a preferred embodiment of the present invention. Network navigator apparatus 190 includes a control program 192 to which are connected an icon mechanism 194, a scanning mechanism 196, a hierarchy mechanism 202, a compiling mechanism 204, and a transfer mechanism 206. Network navigator apparatus 190 depicted in FIG. 9 implements the methods depicted in FIG. 7 and FIG. 8. Network navigator apparatus 190 is composed of multiple mechanism that reside within a computer memory, such as main memory 50 depicted in FIG. 2, and which are executed on a computer processor, such as CPU 31 depicted in FIG. 2. FIG. 9 thus specifically depicts representative components of network navigator apparatus 190. The components depicted in FIG. 9 reside within control program 51 as illustrated in FIG. 2.

Icon mechanism 194 is a component of network navigator apparatus 190 for displaying within a graphical user interface an icon which, when selected by a user, provides a scanning mechanism. Scanning mechanism 196 is a scanning mechanism that searches through a list or table of network addresses. Scanning mechanism 196 can include a first network address scanning mechanism 200 that scans through a hierarchy of network addresses until a network address among the hierarchy of network addresses (e.g., a list of Universal Resource Locators) is identified that corresponds to a search engine network address listed in a list of commonly utilized search engine network addresses. Scanning mechanism 196 can further include a second network address scanning mechanism 198 that scans through the hierarchy of network addresses until a network address among the hierarchy of network addresses is identified that corresponds to a network address associated with a server other than a server associated with a network page currently displayed within a graphical user interface in which a browser or network navigator application is displayed.

Hierarchy mechanism 202 is component of network navigator apparatus 190 that compiles a hierarchy of network addresses accessed by the browser or network navigator during a network navigation session. Compiling mechanism 204 is a component of network navigator apparatus 190 that compiles a list of commonly utilized search engine network addresses. Transfer mechanism 206 is a component of network navigator apparatus 190 that "jumps" to a target Web page or desired network site. Transfer mechanism 206 performs the function indicated by block 148 in FIG. 7 and block 174 in FIG. 8. Thus, transfer mechanism 206 has two functions. The first function is to jump to a network address corresponding to a search engine network address listed in the compiled list of search engine network addresses. A second function is to jump to a network address associated with a server other than the server associated with the network page currently displayed within the graphical user interface within a computer system, such as computer system 20 of FIG. 1 and FIG. 2.

Network navigator apparatus 190 can be described on a higher level as composing a network navigation mechanism (not shown) that allows a user navigating network sites during a current network navigation session to rapidly return from a current network site (e.g., currently displayed Web page) to a previously visited network site accessed during the current network navigation session, without accessing network sites that were encountered between the time the previously visited network site was encountered and the time the current network site was encountered. The system can further include a storage mechanism (not shown) that stores network address sites encountered during the current network navigation session. Network navigator apparatus 190 functions best when at least one intermediate network site is encountered before the current network site is encountered and after the previously visited network site is encountered.

Figure 10:
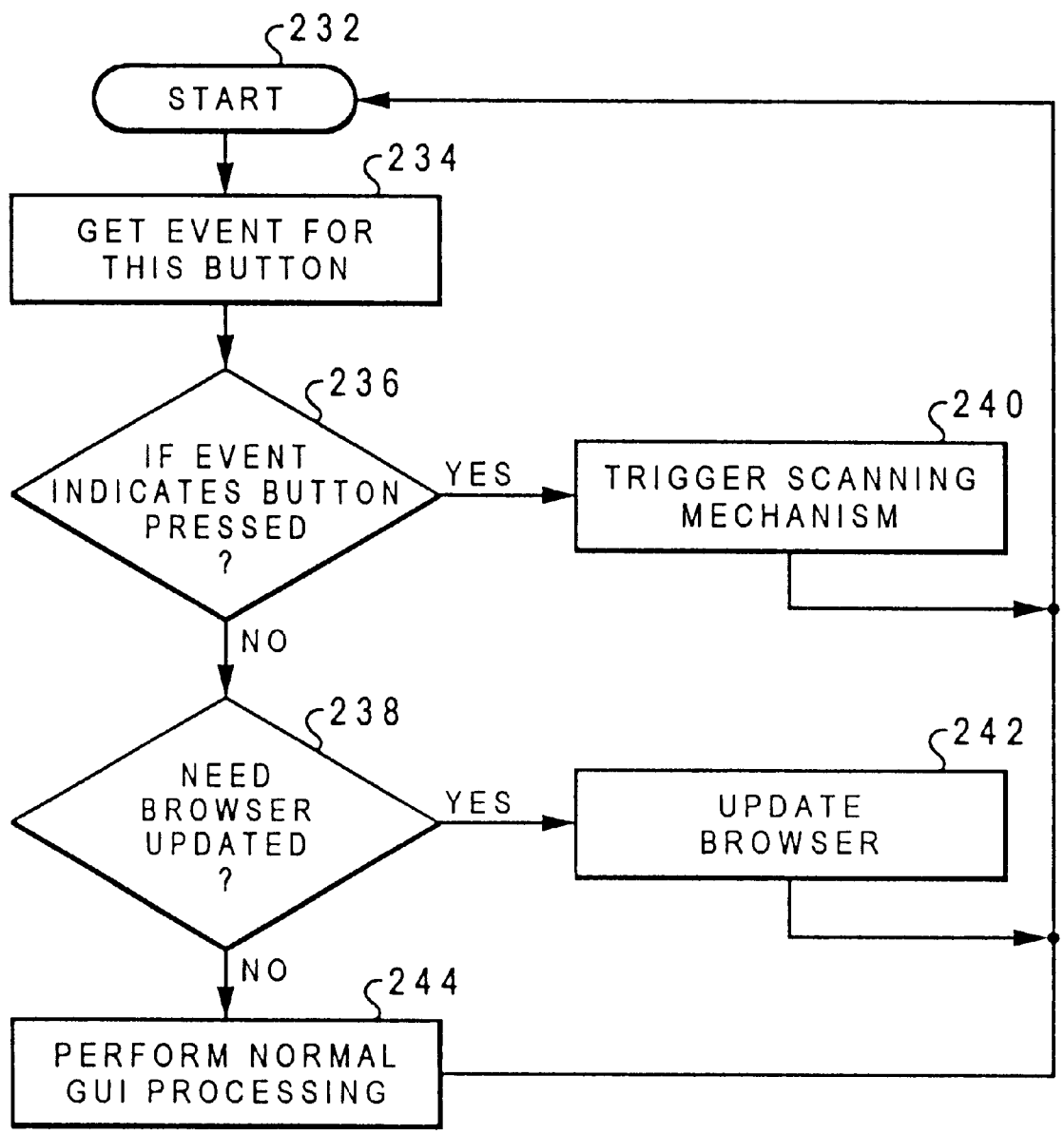
FIG. 10 depicts a flow diagram that shows steps utilized to implement an icon mechanism, according to a preferred embodiment of the present invention.

FIG. 10 depicts a flow diagram 230 that shows steps utilized to implement an icon mechanism, according to the preferred embodiment. As depicted at block 232, a process for implementing the icon mechanism is initiated. The icon mechanism controls an icon located within a graphical user interface such that the icon provides a scanning mechanism in response to a user selection of the icon. As illustrated at block 234, a graphical user interface event is triggered when a button (i.e., icon) is pressed. An event, in the context of a graphical user interface, is an occurrence of significance to a task. For example, user input derived from computer keyboard data-entry keys or pointing devices can trigger events, such as scrolling, saving a particular file, and so forth. As described at block 236, a test is performed to determined whether or not the button, in fact, has been pressed.

Figure 13:
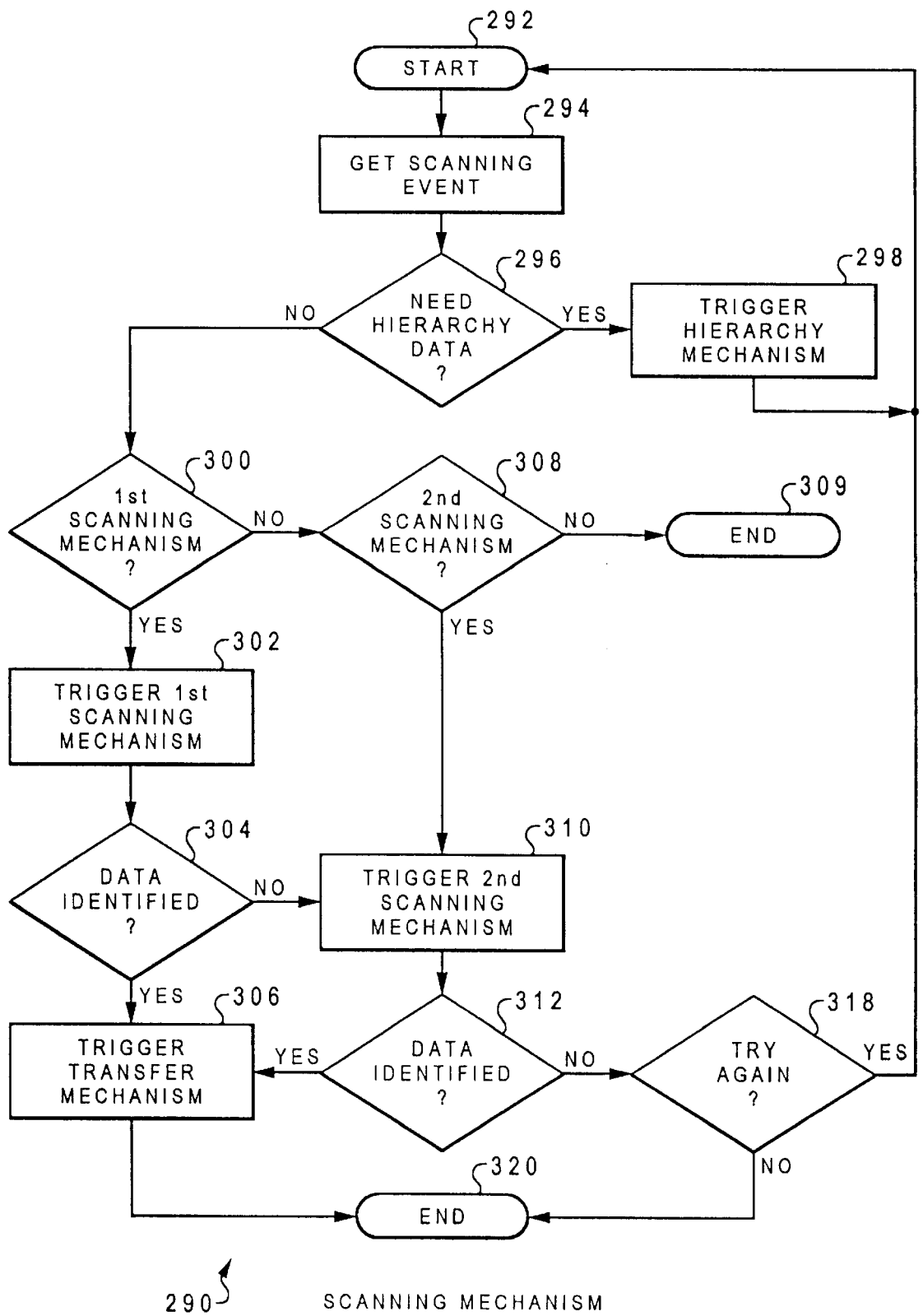
FIG. 13 illustrates a flow diagram depicting steps utilized to implement a scanning mechanism, according to a preferred embodiment of the present invention.

If the test determines that "yes," the button, in fact, has been pressed, then as described at block 240, the scanning mechanism is triggered and the process described in the text relating to FIG. 13 herein is implemented. If the test determines that "no," the button, in fact, has not been pressed, then, as depicted at block 238, a second test is performed to determine whether or not the browser should be updated with information necessary to initiate the icon mechanism. Such information can include protocols necessary to communicate between the graphical user interface and the browser or between the browser and the computer hardware. Such update information is left to the discretion of a browser designer desiring to implement the present invention. If it is determined that it is necessary to update the browser, then, as depicted at block 242, the browser is updated. If it is determined that it is not necessary to update the browser, then as depicted at block 244, the graphical user interface in which the browser is displayed, including the icon that initiates the icon mechanism, continues to process logical operations normally, allowing a browser user to turn to other tasks.

Figure 11:
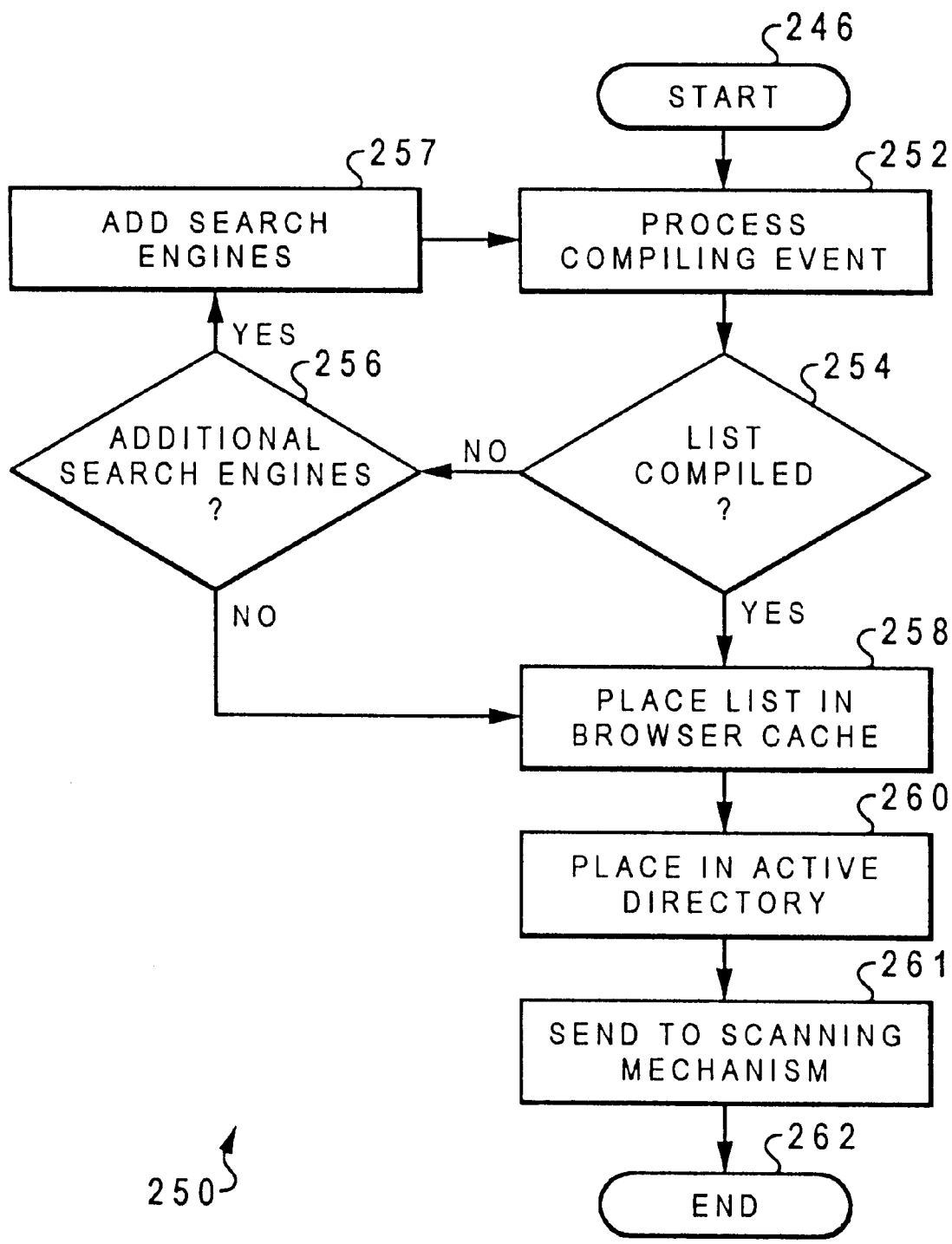
FIG. 11 illustrates a flow diagram that shows steps utilized to implement a compiling mechanism, according to a preferred embodiment of the present invention.

FIG. 11 illustrates a flow diagram 250 that shows steps utilized to implement a compiling mechanism, according to a preferred embodiment of the present invention. As illustrated at block 246, a process for carrying out logical steps of a compiling mechanism is initiated. As depicted at block 252, a compiling event is processed in which a list of common search engine sites, including corresponding Universal Resource Locators, is compiled. As illustrated at block 254, a test is performed to discern whether of not this list is complete. If the list is not complete, then as indicated at block 256, a question is asked to determine whether the list should be updated. If the answer to this question "yes," then, as depicted at block 257, search engines are added to the list and the process continues as normal, as depicted at block 252. However, if the answer to this question is "no," then, as depicted at block 258, the list is placed in a browser cache or memory for later retrieval by the browser. If the list is complete, based on the test performed, as depicted at block 254, the list is also placed in the browser cache where it can be retrieved and utilized in later logical processing operations. As depicted at block 260, the compiled list can be moved or copied from the browser cache where it can be retrieved and utilized in later logical processing operations. As depicted at block 260, the compiled list can be moved or copied from the browser cache to an active directory. Such an active directory can be shared by other mechanisms and components described herein. As depicted at block 261, the information stored in the active directory (i.e., the compiled list of search engines) is transferred to the scanning mechanism. Finally, as described at block 262, the logical process implementing the compiling mechanism is terminated.

Figure 12:
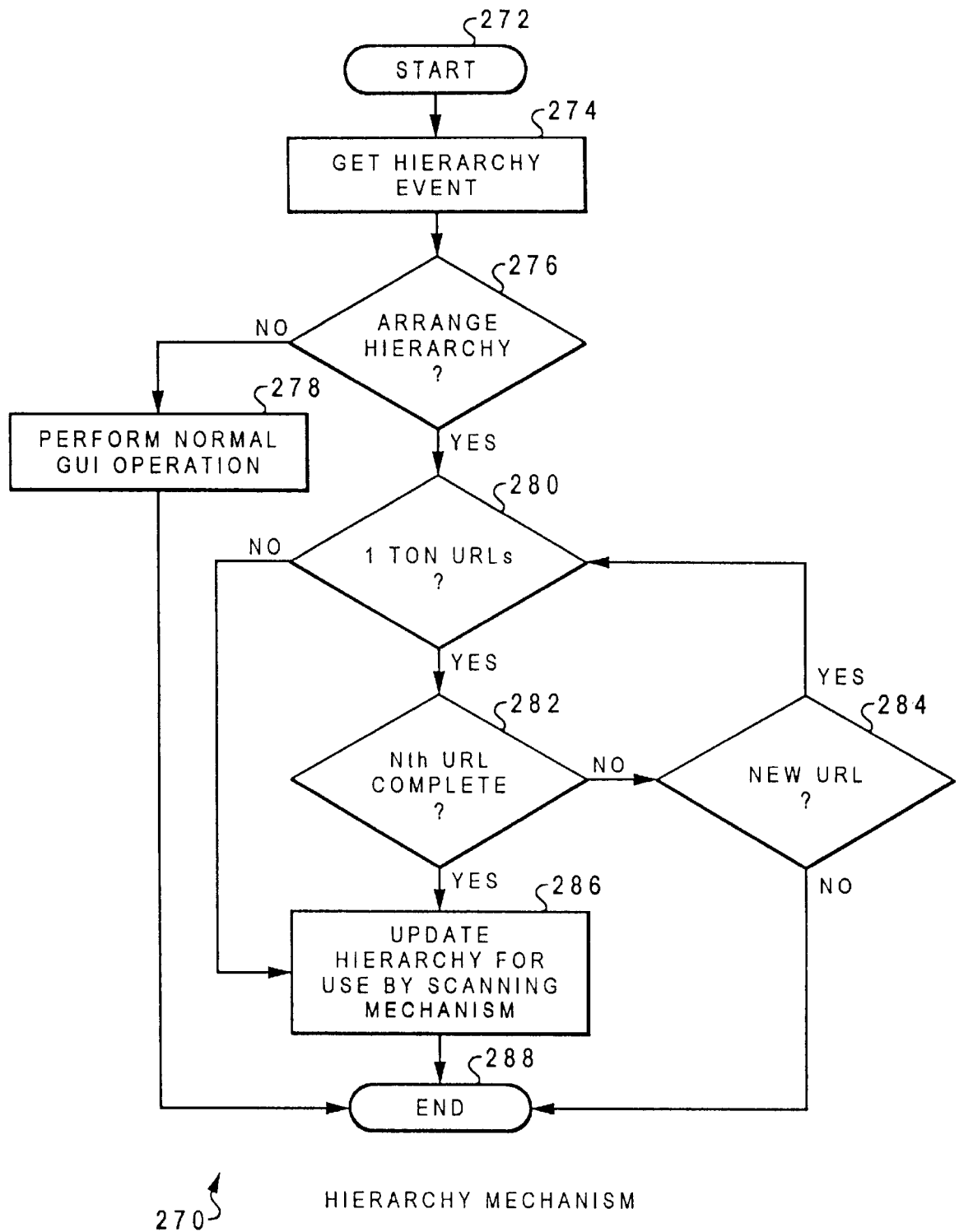
FIG. 12 depicts a flow diagram that shows steps utilized to implement a hierarchy mechanism, according to a preferred embodiment of the present invention.

FIG. 12 depicts a flow diagram 270 that shows steps utilized to implement a hierarchy mechanism, according to a preferred embodiment of the present invention. As depicted at block 272, a process for initiating the hierarchy mechanism is initiated. The hierarchy mechanism arranges a hierarchy of network addresses accessed during a network navigation session. Each network site accessed during a navigation session utilizing a browser has an associated network address (i.e., Universal Resource Locator). Each network address or URL accessed during the navigation session is maintained within a hierarchy of network addresses. The hierarchy of network addresses is arranged in the form of a stack. As new network or Web sites are encountered, network addresses associated with each new site are added to the stack in a sequential fashion, meaning the latest site encountered is added each time to the top or bottom of the stack, depending upon the desires of a browser designer. For example, a browser designer implementing the present invention may desire to add each new network address to the top of such a stack each time a new network is encountered. Thus, the hierarchy mechanism does not act as a sorter. Instead, the hierarchy mechanism merely adds new network addresses to the stack each time a new Web or network site is encountered.

As illustrated at block 274, a hierarchy event is activated, and thereafter, as described at block 276, a question is asked whether a hierarchy arrangement is desired? If the answer to the question is "no," then, as depicted at block 278, normal graphical user interface operations are performed. If the answer to the question is "yes," then, as depicted at block 280, a test is performed to determine whether the first to Nth item in the hierarchy has been arranged. If the answer to the question is yes, a test is then performed, as depicted at block 282, to determine whether or not the Nth item (i.e., URL) is included in the hierarchy of network addresses accessed during the current network navigation session. The Nth URL is equivalent to the network address of the currently displayed network or Web site.

If the test, as described at block 282, indicates that the Nth item has not been included in the list, an additional test is performed, as depicted at block 284, to determine whether a new URL (i.e., network address) should be associated with the Nth network address in the compiled hierarchy of network addresses. If the test performed, as described at block 284, indicates that a new URL should be associated with the Nth network address, then the process repeats, as indicated at block 280. However, if a new URL cannot be found, the process ends and the hierarchy mechanism will have to be activated again. If the answer to the question posed, as depicted at block 280, is "no," then, as depicted at block 286, the hierarchy of network addresses is updated for utilization by the scanning information. If the test performed, as depicted at block 282, determines that the Nth URL is identified and included within the hierarchy of network addresses, the operation depicted at block 286 is also performed. The process finally terminates, as depicted at block 288.

FIG. 13 illustrates a flow diagram 290 depicting steps utilized to implement a scanning mechanism, according to a preferred embodiment of the present invention. As illustrated at block 292, the process implementing the scanning mechanism is initiated. As depicted at block 294, a scanning event occurs. The scanning event is an event in which the hierarchy of network addresses is examined and compared to a list of commonly utilized search engines, or examined for the presence of a network address of a server other than the server in which the currently displayed document originates. As indicated herein, the hierarchy of network addresses can be structured in the form of a stack. As the browser encounters a new Web site via a hypertext link, a Universal Resource Locator representative of each Web site is added to a stack of Universal Resource Locators previously visited by the browser during that particular network navigation session. The stack of Universal Resource Locators (i.e., network addresses) can be arranged in a top-to-bottom fashion or vice-versa. Again, such a choice is left to the browser designer or the designer of a "plug-in" or browser add-on feature to which the present invention can be implemented.

Thus, as illustrated at block 296, a test is performed to determine whether the stack (i.e., hierarchy of network addresses) is empty. As described at block 296, if the stack is empty, meaning that hierarchy data (i.e., Universal Resource Locators) is not available, then as described at block 298, the hierarchy mechanism as described herein is triggered, so that during a given network navigation session, each new Universal Resource Locator encountered by the browser is placed in the stack. If the stack is empty, the process begins again and does not continue until a stack is formed having at least one Universal Resource Locator available to scan, as described by the steps depicted in FIG. 13. If the data is available and ready for processing, then as described at block 300, a test is determined whether to initiate the first scanning mechanism. The first scanning mechanism performs the events of the flowchart outlined in FIG. 7, in which the hierarchy of network addresses is compared to a list of common search engines. As illustrated at block 302, the first scanning mechanism is then triggered. As depicted in block 304, if the desired data is identified (i.e., a network address of a search engine is identified in the hierarchy of network addresses), then, as depicted at block 306, the transfer mechanism is triggered in which the browser "jumps" to a Web site or a Web page associated with the identified network address.

If, as illustrated at block 300, it is chosen not to implement the first scanning mechanism, then, as depicted at block 308, a test is performed to determined whether a second scanning mechanism should be implemented. If the second scanning mechanism is not implemented, the process simply terminates, as described at block 309. If it is chosen to implement the second scanning mechanism, then as described at block 310, the second scanning mechanism is triggered. The second scanning mechanism performs the logical operations outlined in FIG. 8, in which the hierarchy of network addresses (i.e., URLs) is examined for inclusion of a network address of a server other than the server associated with the Web page site of the currently displayed Web page. One skilled in the art will appreciate that a network address (i.e., an URL) includes data indicative of a particular server.

As described at block 312, if such a network address is identified, then, as depicted at block 306, the transfer mechanism is triggered in which the browser "jumps" to a Web page of a server not associated with the currently displayed Web page. If, as described at block 312, such a network address is not identified, then as illustrated at block 318, a decision is made whether to make another attempt at searching for the desired Web site or to terminate the process. If a decision is made to end the process, then the process terminates, as indicated at block 320. If a decision is made to make another attempt, then the process begins again, as depicted at block 292. In addition, in FIG. 13, as described at block 304 a decision also can be made whether to implement the second scanning mechanism in addition to the first scanning mechanism. As depicted at block 304, if the desired network address data of a common search engine is not identified in the hierarchy of network address data, then as described at block 310, the second scanning mechanism is triggered and the process continues accordingly.

Figure 14:
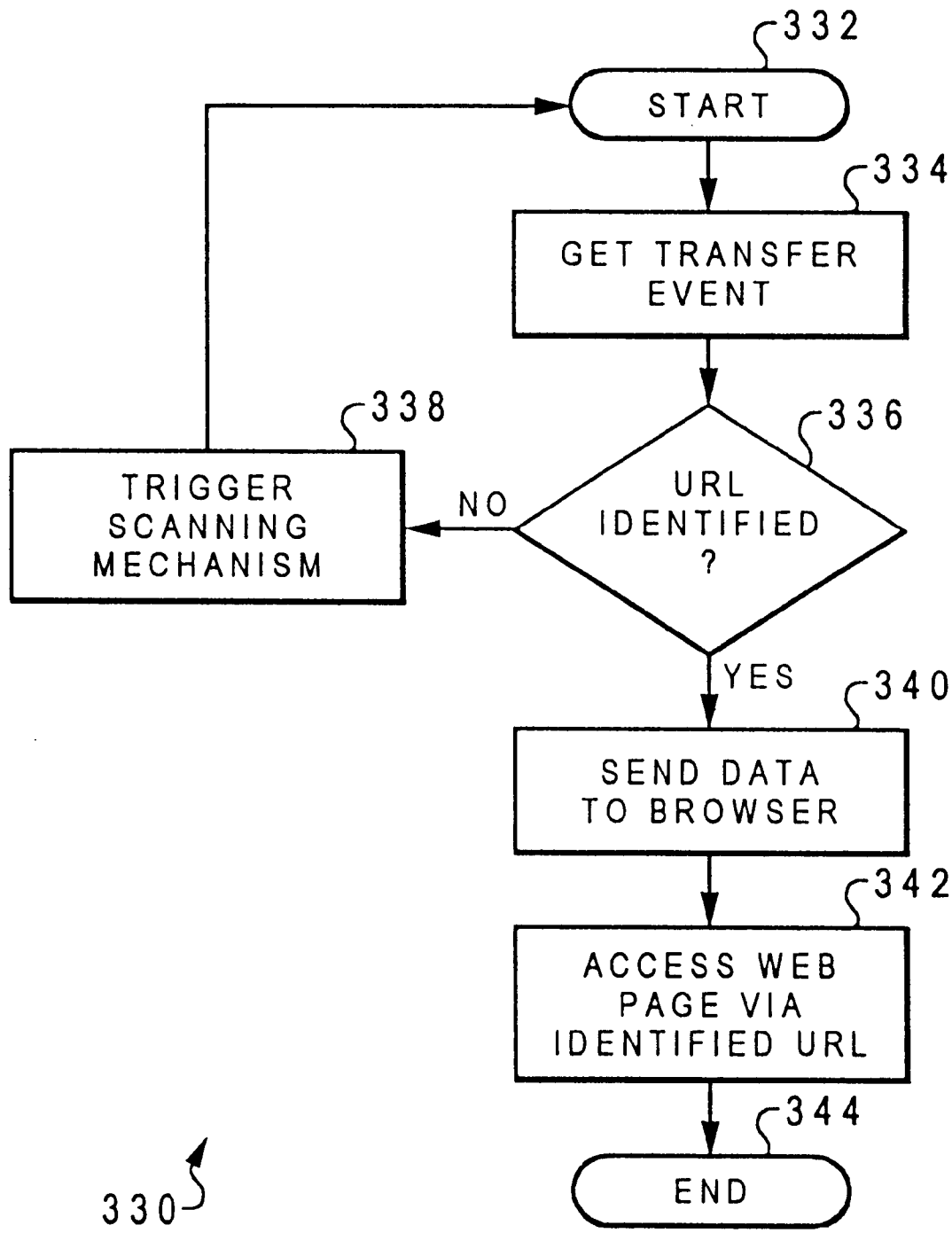
FIG. 14 illustrates a flow diagram depicting steps utilized to implement a transfer mechanism, according to a preferred embodiment of the present invention.

FIG. 14 illustrates a flow diagram 330 depicting steps utilized to implement a transfer mechanism, according to a preferred embodiment of the present invention. As indicated at block 332, the logical steps implementing a transfer mechanism begin. The transfer mechanism is a component of a browser (i.e., a network navigator) that allows a user to "jump" to a different Web page via a hypertext link, such as the hypertext links depicted in FIG. 6. As described at block 334, a transfer event is received. As illustrated at block 336, a test is performed to determine whether a desired network address (i.e., URL) has been identified. The desired network address is that network address identified, as described at blocks 304 or 312 of FIG. 13. If the network address has not been identified, then as described at block 338, the scanning mechanism is triggered, implementing the flow of operations outlined in FIG. 13. If the network address has been identified, then as described at block 340, this information is sent to the browser. As illustrated at block 342, the browser then accesses the new Web site associated with the identified network address (i.e., URL) via a hypertext link.

The embodiments and examples set forth herein are presented in order to best explain the present invention and its practical application and, thereby, to enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method for automatically replacing content from a current server displayed in a display device of a data processing system with content from a previously accessed server, said method comprising:

displaying within a display device of a data processing system content from a current network site on a current server;

displaying a previous-server object within said display device;

maintaining a history list identifying a plurality of network sites accessed during a session, said identified network sites including:

an intermediate network site on said current server, wherein said intermediate network site was accessed before said current network site;

a previous network site on a previous server, wherein said previous network site was accessed before said intermediate network site and wherein said previous server differs from said current server; and an initial network site that was accessed before said previous network site; and in response to a single selection of only said previous-server object, automatically identifying said previous network site and automatically displaying content from said previous network site in lieu of content from said current network site.

2. A method according to claim 1, wherein:

said step of maintaining a history list includes storing a visited-site address for each of said plurality of network sites in said list; and said step of automatically identifying said previous network site comprises automatically comparing said address of said current network site with said visited-site addresses, in reverse chronological order, to determine which most recently accessed visited-site address is associated with a server that differs from said current server.

3. A method according to claim 1, wherein:

content from said current network site is displayed within a content area within said display device;

said previous-server object is displayed, among a plurality of selectable objects that initiate actions in response to operator selection, within a selectable-object area within said display device; and a history object is also displayed among said plurality of selectable objects, wherein said history object causes a pull-down list identifying said plurality of network sites to be displayed.

4. A method according to claim 3, wherein said previous-server object is automatically displayed at all times that said identified network sites include said intermediate network site and said previous network site.

5. A method according to claim 1, further comprising:

maintaining a search-engine list that includes at least one search-engine address identifying a search-engine site on a search-engine server, and wherein:

said previous-server object indicates a return to a search-engine;

said step of maintaining said history list includes storing a visited-site address for each of said plurality of network sites in said list; and said step of automatically consulting said history list to identify said previous network site comprises automatically comparing said at least one search-engine address with said visited-site addresses, in reverse chronological order, to determine which most recently accessed visited-site address is associated with a server that matches said search-engine server.

6. A method according to claim 5, wherein:

content from said current network site is displayed within a content area within said display device;

said previous-server object is displayed, among a plurality of selectable objects that initiate actions in response to operator selection, within a selectable-object area within said display device; and a history object is also displayed among said plurality of selectable objects, wherein said history object causes a pull-down list identifying said plurality of network sites to be displayed.

7. A method according to claim 6, wherein said previous-server object is automatically displayed at all times that said identified network sites include said intermediate network site and said previous network site.

8. A data processing system with facilities for automatically replacing displayed content from a current server with content from a previously accessed server, said data processing system comprising:

a processor and memory in communication with said processor;

a display device in communication with said processor; and presentation facilities stored in said memory and executable by said processor for displaying within said display device content from a current network site on a current server, said presentation facilities including:

a previous-server object displayed in said display device; and a history list that identifies a plurality of network sites accessed during a session, said identified network sites including:

an intermediated network site on said current server, wherein said intermediate network site was accessed before said current network site;

a previous network site on a previous server, wherein said previous network site was accessed before said intermediate network site and wherein said previous server differs from said current server; and an initial network site that was accessed before said previous network site; and wherein, in response to a single selection of only said previous-server object, said presentation facilities automatically identify said previous network site and automatically display content from said previous network site in lieu of content from said current network site.

9. A data processing system according to claim 8, wherein:

said history list includes a visited-site address for each of said plurality of network sites in said list; and said presentation facilities identify said previous network site by automatically comparing said address of said current network site with said visited-site addresses, in reverse chronological order, to determine which most recently accessed visited-site address is associated with a server that differs from said current server.

10. A data processing system according to claim 8, wherein:

said presentation facilities provide a content area within which content from said current network site is displayed;

said presentation facilities also provide a selectable-object area within which selectable objects that initiate actions in response to operator selection are displayed;

said selectable objects include said previous server object; and said selectable objects include a history object that causes a pull-down list identifying said plurality of network sites to be displayed.

11. A data processing system according to claim 8, wherein said presentation facilities automatically display said previous-server object at all times that said identified network sites include said intermediate network site and said previous network site.

12. A data processing system according to claim 8, wherein:

said presentation facilities also include a search-engine list that includes a least one search-engine address identifying a search-engine site on a search-engine server;

said previous-server object indicates a return to a search-engine;

said history list includes a visited-site address for each of said plurality of network sites in said list; and said presentation facilities identify said previous network site by automatically comparing said at least one search-engine address with said visited-site addressed, in reverse chronological order, to determine which most recently accessed visited-site address is associated with a server that matches said search-engine server.

13. A data processing system according to claim 12, wherein:

said presentation facilities provide a content area within which content from said current network site is displayed;

said presentation facilities also provide a selectable-object area within which selectable objects that initiate actions in response to operator selection are displayed;

said selectable objects include said previous server object; and said selectable objects include a history object that causes a pull-down list identifying said plurality of network sites to be displayed.

14. A data processing system according to claim 13, wherein said presentation facilities automatically display said previous-server object at all times that said identified network sites include said intermediate network site and said previous network site.

15. A program product for automatically replacing displayed content from a current server with content from a previously accessed server, said program product comprising:

presentation facilities for causing a data processing system to display content from a current network site on a current server in a display device of a data processing system, said presentation facilities including:

a previous-server object displayed in said display device; and a history list that identifies a plurality of network sites accessed during a session, said identified network sites including:

an intermediated network site on said current server, wherein said intermediate network site was accessed before said current network site;

a previous network site on a previous server, wherein said previous network site was accessed before said intermediate network site and wherein said previous server differs from said current server; and an initial network site that was accessed before said previous network site; and wherein, in response to a single selection of only said previous-server object, said presentation facilities automatically identify said previous network site and automatically display content from said previous network site in lieu of content from said current network site.

16. A data processing system according to claim 15, wherein:

said history list includes a visited-site address for each of said plurality of network sites in said list; and said presentation facilities identify said previous network site by automatically comparing said address of said current network site with said visited-site addresses, in reverse chronological order, to determine which most recently accessed visited-site address is associated with a server that differs from said current server.

17. A program product according to claim 15, wherein:

said presentation facilities provide a content area within which content from said current network site is displayed;

said presentation facilities also provide a selectable-object area within which selectable objects that initiate actions in response to operator selection are displayed;

said selectable objects include said previous server object; and said selectable objects include a history object that causes a pull-down list identifying said plurality of network sites to be displayed.

18. A program product according to claim 15, wherein said presentation facilities automatically display said previous-server object at all times that said identified network sites include said intermediate network site and said previous network site.

19. A program product according to claim 15, wherein:

said presentation facilities also include a search-engine list that includes at least one search-engine address identifying a search-engine site on a search-engine server;

said previous-server object indicates a return to a search-engine;

said history list includes a visited-site address for each of said plurality of network sites in said list; and said presentation facilities identify said previous network site by automatically comparing said at least one search-engine address with said visited-site addresses, in reverse chronological order, to determine which most recently accessed visited-site address is associated with a server that matches said search-engine server.

20. A program product according to claim 19, wherein:

said presentation facilities provide a content area within which content from said current network site is displayed;

said presentation facilities also provide a selectable-object area within which selectable objects that initiate actions in response to operator selection are displayed;

said selectable objects include said previous server object; and said selectable objects include a history object that causes a pull-down list identifying said plurality of network sites to be displayed.

21. A program product according to claim 20, wherein said presentation facilities automatically display said previous-server object at all times that said identified network sites include said intermediate network site and said previous network site.

* * * * *

UNITED STATES PATENT AND TRADEMARK OFFICE
CERTIFICATE OF CORRECTION

PATENT NO. : 6,052,716
DATED : Apr. 18, 2000
INVENTOR(S) : Kevin Patrick Gibson

It is certified that error appears in the above-identified patent and that said Letters Patent is hereby corrected as shown below:

Claim 12, Col. 16, Line 18, "addressed" should be --addresses--.

Claim 15, Col. 16, Line 55, "intermediated" should be --intermediate--.

Claim 15, Col. 17, Line 3, after "site" insert --; and a computer usable medium encoding said presentation facilities--

Signed and Sealed this

Sixth Day of March, 2001

Attest:

NICHOLAS P. GODICI

*Attesting Officer*  *Acting Director of the United States Patent and Trademark Office*